United States Patent [19]

Sauer

[11] Patent Number: 5,545,873
[45] Date of Patent: Aug. 13, 1996

[54] VARIABLE CONTROL OF WELD TORCH PARAMETERS

[75] Inventor: Curtis R. Sauer, Claremore, Okla.

[73] Assignee: Howmet Corporation, Greenwich, Conn.

[21] Appl. No.: 337,326

[22] Filed: Nov. 9, 1994

[51] Int. Cl.⁶ .................................................... B23K 9/12
[52] U.S. Cl. .................. 219/124.03; 219/125.1
[58] Field of Search .................. 219/124.03, 124.02, 219/124.34, 125.1

[56] References Cited

U.S. PATENT DOCUMENTS

| | | | |
|---|---|---|---|
| 3,119,009 | 1/1964 | Zeller | 219/125.1 |
| 3,264,447 | 8/1966 | Agnew | 219/124.02 |
| 3,513,281 | 5/1970 | Haase et al. | 219/124.02 |
| 4,621,183 | 11/1986 | Takeuchi et al. | 219/121 |
| 4,672,171 | 6/1987 | Cusimano et al. | 219/121 |
| 4,689,463 | 8/1987 | Shubert | 219/76.16 |
| 4,739,146 | 4/1988 | Lindland et al. | 219/121 |
| 4,745,256 | 5/1988 | Shubert | 219/121 |
| 4,808,055 | 2/1989 | Wertz et al. | 416/224 |
| 4,822,248 | 4/1989 | Wertz et al. | 416/192 |
| 4,878,953 | 11/1989 | Saltzman et al. | 148/4 |
| 4,940,390 | 7/1990 | Clark et al. | 416/241 |

OTHER PUBLICATIONS

Automated Welding Of Turbine Blades; Am. Soc. of Mech. Eng., 89–GT–307, pp. 1–7, Liburdi, Lowden and Pilcher.
Integrated Weld Automation for Gas Turbine Blades; Am. Soc. of Mech. Eng., 91–GT–159, pp. 1–7, Lowden, Piilcher and Liburdi.
Laser And Micro–Plasma Welding Of Single Crystal Blades Advantages Of Total Process Control; Am. Soc. of Mech. Eng., 93–GT–367, pp. 1–6, Pilcher, Liburdi, Berger and Iovene.

*Primary Examiner*—Clifford C. Shaw
*Attorney, Agent, or Firm*—Edward J. Timmer

[57] ABSTRACT

A weld apparatus comprises a compound slide for moving a welding torch relative to a substrate to be welded so as to traverse a surface of the substrate. A control system disposed on the slide and comprises a control slide rail disposed on the slide for movement relative thereto in response to a depression on the substrate or a previous weld bead being encountered by a weld torch on the rail. A contact wheel is disposed on the slide and is engaged by the rail in a manner to rotate the wheel in response to the welding torch encountering a depression. A switch or other device is actuated by the contact wheel to generate an electrical signal indicative that a depression has been encountered for adjusting a weld parameter.

10 Claims, 3 Drawing Sheets

VARIABLE CONTROL OF WELD TORCH PARAMETERS

FIELD OF THE INVENTION

The present invention relates to a weld apparatus and method using a variable control system to detect and level an irregularity, such as a thin wall, depression, etc. on a substrate or on previous weld bead by variable control of one or more weld parameters.

BACKGROUND OF THE INVENTION

The articles entitled "Automated Welding of Turbine Blades", 1989, and "Integrated Weld Automation for Gas Turbine Engine Blades", 1991, published by The American Society Of Mechanical Engineers describe welding of turbine blade tips for repair purposes. Usually, in blade tip repair, multiple weld beads of a suitable material are laid down one atop the other on the turbine blade tip to build it up to desired dimension. The presence of an uneven wall (thin) region on the turbine blade tip or previously deposited bead can cause the welding torch to burn through the blade tip or the previously deposited bead, resulting in an unacceptable repair.

An object of the present invention is to provide a variable control system that can detect a surface irregularity on a substrate, such as a turbine blade tip, and automatically adjust a weld parameter to accommodate and level the surface irregularity and avoid weld burn through of the substrate or a previously deposited weld bead on the substrate.

SUMMARY OF THE INVENTION

In one embodiment, the present invention provides a weld apparatus and method comprising slide means for moving a welding tool relative to a substrate to be welded so as to traverse a surface of the substrate and a variable control system disposed on the slide means. The variable control system comprises an arc voltage control slide having a rail for movement relative to the slide means and a welding tool, such as a welding torch, disposed on the arc voltage control slide. The control slide is movable relative to the slide means in response to an irregularity, such as a thin wall variation, surface height variation and depression, on the substrate surface or on a previous weld bead being encountered by the welding tool. A contact wheel is disposed on the slide means and engaged by the slide rail in a manner to rotate the wheel in response to the welding tool encountering the irregularity.

A switch or other signal generating device is actuated by rotation of the contact wheel to generate an electrical signal indicative that a irregularity has been encountered for adjusting a weld parameter. The traversal speed of the welding tool and the electrical current to the welding tool are adjusted to level or even the irregularity on the substrate surface without burn through. The weld filler material feed rate can also be adjusted to the same end.

In one embodiment of the invention, the contact wheel is disposed on a lever biased in a manner to engage the contact wheel with the rail during initial weld passes until the irregularity is levelled. An actuator, such as a solenoid, is connected to the lever for moving it in a manner counter to the bias to disengage the rail and the contact wheel when the irregularity has been leveled or evened.

The weld apparatus and method of the present invention are useful, but not limited to, weld repair of turbine blade tips by building up multiple weld beads or layers on the tip and automatically accommodating irregularities such as depressions, wall thickness variations, and surface height variations on the tip or previous weld bead.

The objects and advantages of the invention will become more readily apparent from the following description taken with the following drawings.

DESCRIPTION OF THE INVENTION

Although the present invention is described and illustrated herebelow with respect to a weld apparatus and method for repair of turbine blade tip by building up multiple weld beads or layers on the tip, the invention is not so limited and can be used in other automatic welding apparatus and processes. The weld apparatus and method for turbine blade tip repair are offered for purposes of illustrating the invention.

Figure 1:
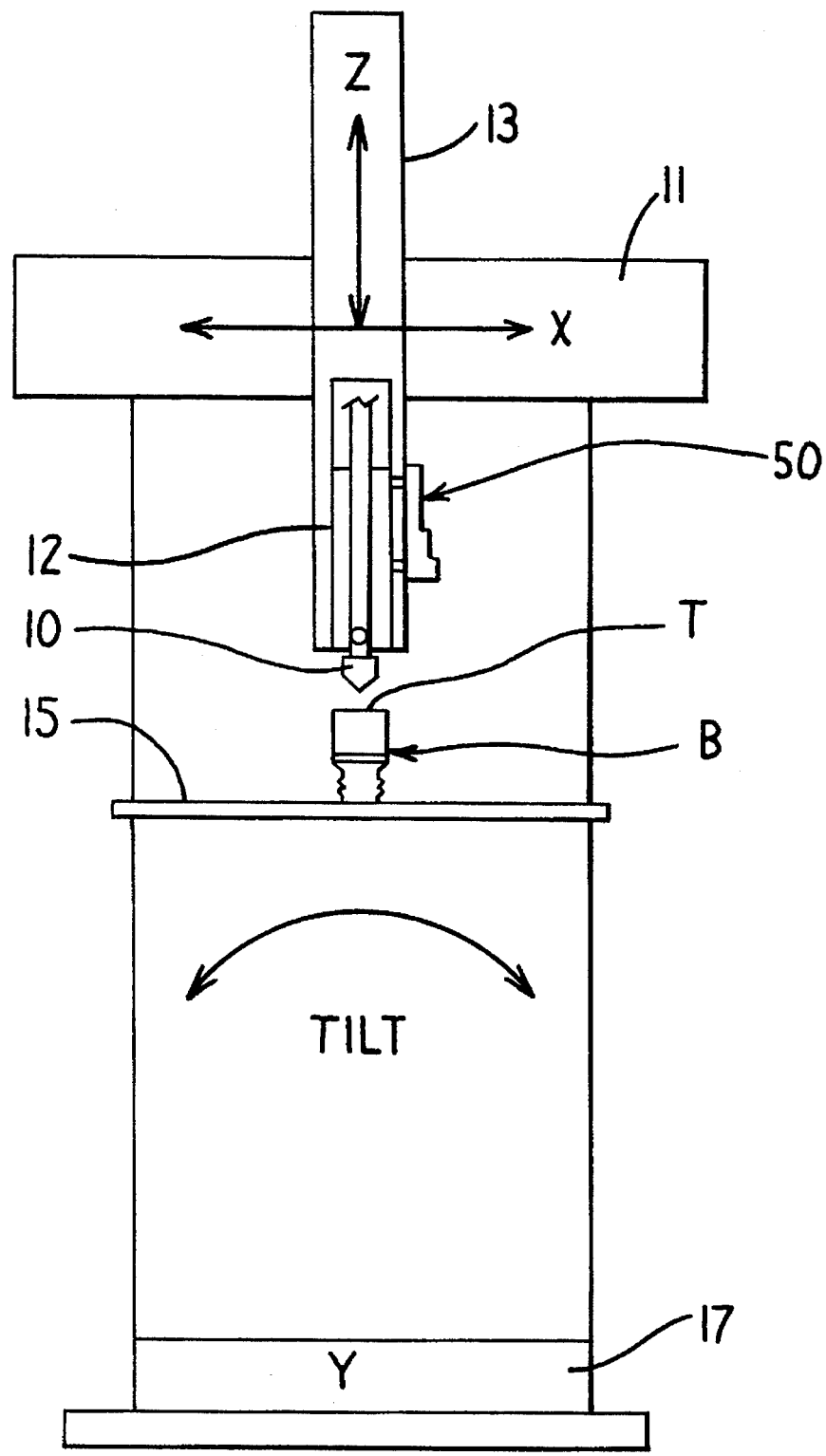
FIG. 1 is a schematic view of a plasma weld apparatus with which the invention is useful, but not limited.

Referring to FIG. 1, the weld apparatus comprises a welding tool 10 mounted on a Z axis slide 13 (vertical slide) and X axis slide 11 (horizontal slide) above a work table 15 on which a turbine blade B is fixtured with its end tip T to be repaired located proximate the weld torch 10. The slides 11, 13 constitute a compound slide assembly. The work table 15 is mounted on a Y axis slide 17 disposed on a base and is movable perpendicular to the other axes in a direction into and out of the plane of the drawing. The work table 15 also is rotatable about a vertical axis (in the horizontal plane) and tiltable in the direction of the arrow in FIG. 1. The slides 11, 13, 17 and table 15 effect relative movement between the tip T and the welding tool 10 so that the tool 10 can be caused to traverse the end surface of the tip T to lay down or deposit multiple weld beads or layers atop one another from powdered or wire filler metal or alloy supplied to the torch 10 in conventional manner. The welding tool 10 can comprise a conventional plasma arc welding torch used in the repair of turbine blade tips and having a non-consumable electrode supplied with electrical power and plasma forming gas (e.g. argon) through one or more conduits from conventional power and gas sources. Other types of welding tools can be used however in the practice of the invention.

The welding tool 10 is mounted on arc voltage control slide or unit 12 which is disposed for vertical movement relative to the Z axis slide 13 and provides arc voltage signals to an arc voltage control (not shown) to maintain a predetermined gap between the torch 10 and the surface of the tip T. The arc voltage control slide or unit 12 includes a built-in servomotor (not shown) that moves the slide or unit 12 relative to the Z axis slide 13 to maintain a predetermined arc voltage that is representative of a preset or predetermined gap distance between the torch 10 and tip T.

A variable control system 50 is disposed on an extension 13a of the slide 13 between the arc voltage control slide or unit 12 and slide 13 to detect relative movement therebetween due to an irregularity, such as a unevenness or depression, on the blade tip surface T being encountered. The control system 50 adjusts one or more weld parameters to level or even the irregularity.

Figure 2:
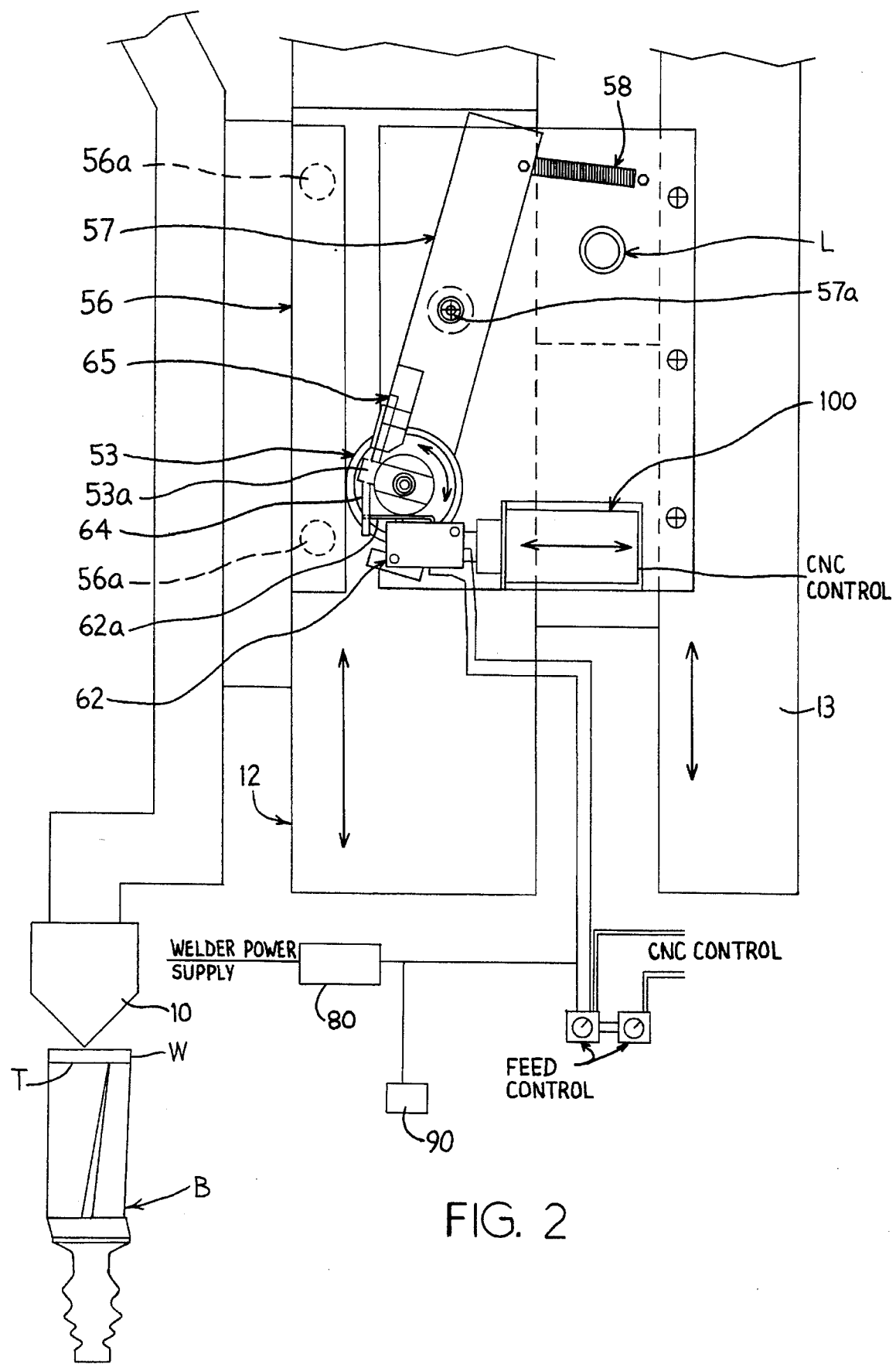
FIG. 2 is a schematic view of the variable control system of the present invention disposed on a compound slide of the weld apparatus of FIG. 1.
Figure 3:
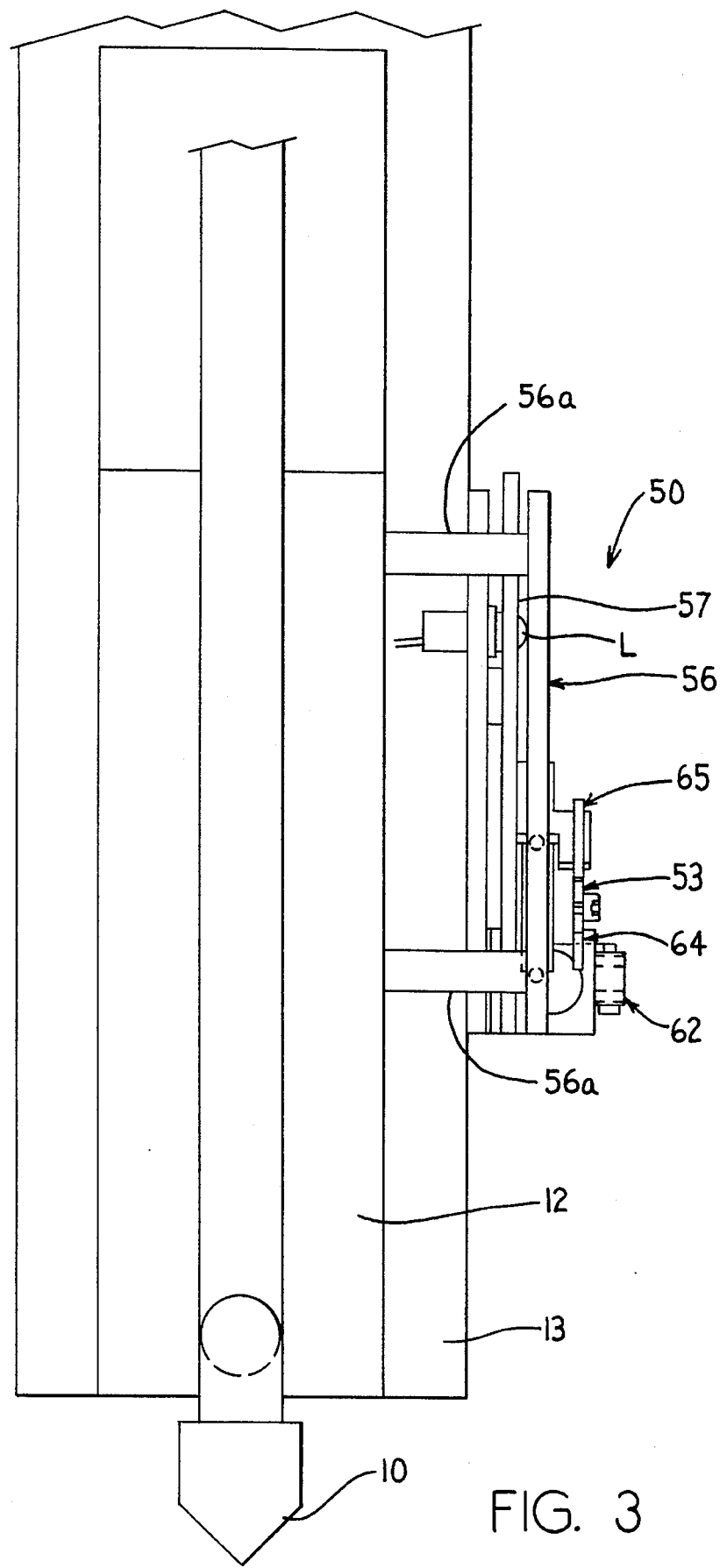
FIG. 3 is a schematic side elevation of the variable control system of FIG. 2.

Referring to FIGS. 2–3, the variable control system 50 includes a arc voltage control slide rail 56 fastened to the control slide or unit 12 by posts 56*a* and adapted to engage and drive a rotatable contact wheel 53 rotatably disposed on a spring biased lever 57 that is pivotally disposed by screw 57*a* on the extension 13*a* of the Z axis slide 13. During initial weld passes relative to the tip T, the bias spring 58 connected to the lever 57 provides biased driving engagement between the contact wheel 53 and the rail 56 so that relative movement of the rail 56 rotates the wheel 53.

In operation pursuant to a method embodiment of the invention, during deposition of the initial weld beads W on the tip T, the variable control system 50 is operative to sense any localized unevenness of a previously deposited weld bead (or blade tip T on the first pass) and generate an electrical signal to vary one or more of the traversal speed of the welding tool relative to the substrate on the slide means, the electrical current to the welding tool and weld filler material feed rate to level the irregularity. In particular, upon encountering a thin wall, depression or uneven region on the tip T or on a previous weld bead W, the welding tool 10 initially can start to burn through the tip or previous bead W at the region. The arc voltage control servomotor will move the torch 12 in a direction toward the tip T to maintain the preset gap between the torch 10 and tip T. The resulting motion between the arc voltage control control slide or unit 12 and the Z axis slide 13 results in relative motion between the control slide rail 56 and contact wheel 53 to rotate the contact wheel 53 such that the tongue or dog 53*a* thereof engages the lower adjusting and stop screw 64 which is connected to a switch plate 62*a* of off/on micro-switch 62 (or potentiometer or other signal generating device). The lower adjusting and stop screw 64 is spaced a preselected distance from the dog 53*a* so that a predetermined unevenness or depth can be sensed and leveled by filling with weld filler material. The dog 53*a* of contact wheel 53 contacts adjusting and stop screw 65 to limit movement of the contact wheel in the opposite direction.

Further motion of the torch 10 toward the tip T by the arc voltage control servomotor provides further relative motion between the control slide or unit 12 and Z axis slide 13 to cause the switch 62 to be actuated to generate a signal indicative that an unevenness, depression, etc. has been encountered. The signal then is used to adjust the traversal speed of the welding tool 10 via X axis and Y axis slide speed or feed controls interfaced to the CNC unit to level or fill the depression with filler material. For example, the speed of the X and Y axes of movement of the welding tool 10 can be slowed or increased by a predetermined incremental amount stored in the CNC unit to this end. Alternately, the speeds of all of the moving slides involved can be controlled in this manner to this same end. Torch traversal speed relative to the tip T can be reduced or increased incrementally or proportionally via adjustment to slide speeds to level the unevenness. In addition, the torch electrical current can be varied concurrently in similar manner this same end using a conventional amperage control 80 responsive to the signal from the micro-switch 62 or the CNC unit 75. Also, the amount of powder weld filler material supplied to the welding tool 10 can be adjusted in similar manner. For example, the powder (or wire) weld filler material feed rate can be adjusted to this end using a conventional proportional valve 90 communicated to a weld powder filler supply. The flow rate of carrier gas having filler powder entrained therein can be adjusted to this end. An indicator light L can be energized in response to the signal from switch 62 to indicate the control system 50 is operative.

After the initial weld beads W are deposited on the tip T and levelled in the manner described hereabove, a solenoid 100 connected to the end of the lever 57 can be actuated to overcome the bias of the spring 58 to retract or disengage the contact wheel 53 from the control slide rail 56 to disengage the variable control system 50 during the laying down of subsequent weld beads on the previously deposited and levelled weld beads W. The solenoid 100 rotates the lever to this end. The dog 53*a* of contact wheel 53 contacts adjusting and stop screw 65 to limit movement of the contact wheel.

Although the invention has been described hereabove with respect to a variable control system comprising the control slide rail 6 and contact wheel 53, the invention is not so limited and can be practiced using other position detecting devices that detect the relative movement of the arc voltage control slide or unit 12 relative to the Z axis slide 13 when a surface irregularity is encountered on the tip T and provide position feedback signals that can be used adjust one or more weld parameters as discussed hereabove. A linear scale of glass or magnetic material having incremental distance markers thereon can be used in lieu of the rail 56 to this end and a marker sensor can be used in lieu of the contact wheel 53 to detect or sense the markers and thus relative movement of the slide or unit 12 relative to the Z axis slide 13.

Although certain embodiments of the invention have been described hereabove, modifications and changes can be made therein within the scope of the invention as set forth in the following claims.

I claim:

1. A weld apparatus comprising first slide means for moving a welding tool relative to a surface of a substrate to be welded, and a variable control system disposed on the first slide means, said control system comprising an arc voltage control second slide disposed on the first slide means for movement relative thereto in a direction parallel therewith, a welding tool disposed on said control second slide, said control second slide being movable relative to said first slide means in response to an irregularity on the substrate or on a previous weld bead being encountered by said welding tool, and a position detecting device disposed for detecting said relative movement between said first slide means and said control second slide in response to said welding tool encountering said irregularity to generate an electrical signal indicative that an irregularity has been encountered for adjusting a weld parameter.

2. A weld apparatus comprising first slide means for moving a welding tool relative to a surface of a substrate to be welded, and a control system disposed on the first slide means, said control system comprising an arc voltage control second slide disposed on the first slide means for movement relative thereto in a direction parallel therewith, a welding tool disposed on the control second slide, said first slide means and said control second slide being relatively movable in response to an irregularity on the substrate or on a previous weld bead being encountered by said welding tool, and a contact wheel disposed on said first slide means for engagement by said control second slide in a manner to rotate said contact wheel in response to said welding tool encountering said irregularity, and a signal generating device actuated by said wheel to generate an electrical signal indicative that an irregularity has been encountered for adjusting a weld parameter.

3. The apparatus of claim 2 wherein the wheel is disposed on a lever biased in a manner to engage said contact wheel and control slide.

4. The apparatus of claim 3 wherein one end of the lever is spring biased.

5. The apparatus of claim 2 further comprising an actuator connected to said lever for moving it in a manner counter to said bias to disengage said control slide and contact wheel in response to levelling of the irregularity.

6. The apparatus of claim 5 wherein the actuator is a solenoid.

7. The apparatus of claim 2 including a weld apparatus computer control unit receives the signal indicative that an irregularity has been encountered.

8. The apparatus of claim 2 wherein at least one of the traversal speed of the welding tool relative to the substrate, electrical current to the welding tool, and weld filler material feed rate is adjusted.

9. A welding method comprising moving first slide means relative to a substrate to be welded, moving an arc voltage control second slide disposed on said first slide means and having a welding tool thereon relative to said first slide means in a parallel direction therewith in response to an irregularity on the substrate surface or on a previous weld bead being encountered by said welding tool, rotating a contact wheel disposed on said first slide means by engagement with said control second slide in response to said welding tool encountering the irregularity, generating an electrical signal by said wheel rotation, said signal being indicative that the irregularity has been encountered, and adjusting a weld parameter in response to said signal.

10. The method of claim 9 wherein at least one of of the traversal speed of the welding tool relative to the substrate, electrical current to the welding tool, and weld filler material feed rate are adjusted.

* * * * *